Aug. 12, 1924.
J. N. REYNOLDS
1,504,785
METHOD OF AND APPARATUS FOR INDICATING THE ATTITUDE OF AIRCRAFT
Original Filed Dec. 30, 1918   3 Sheets—Sheet 1
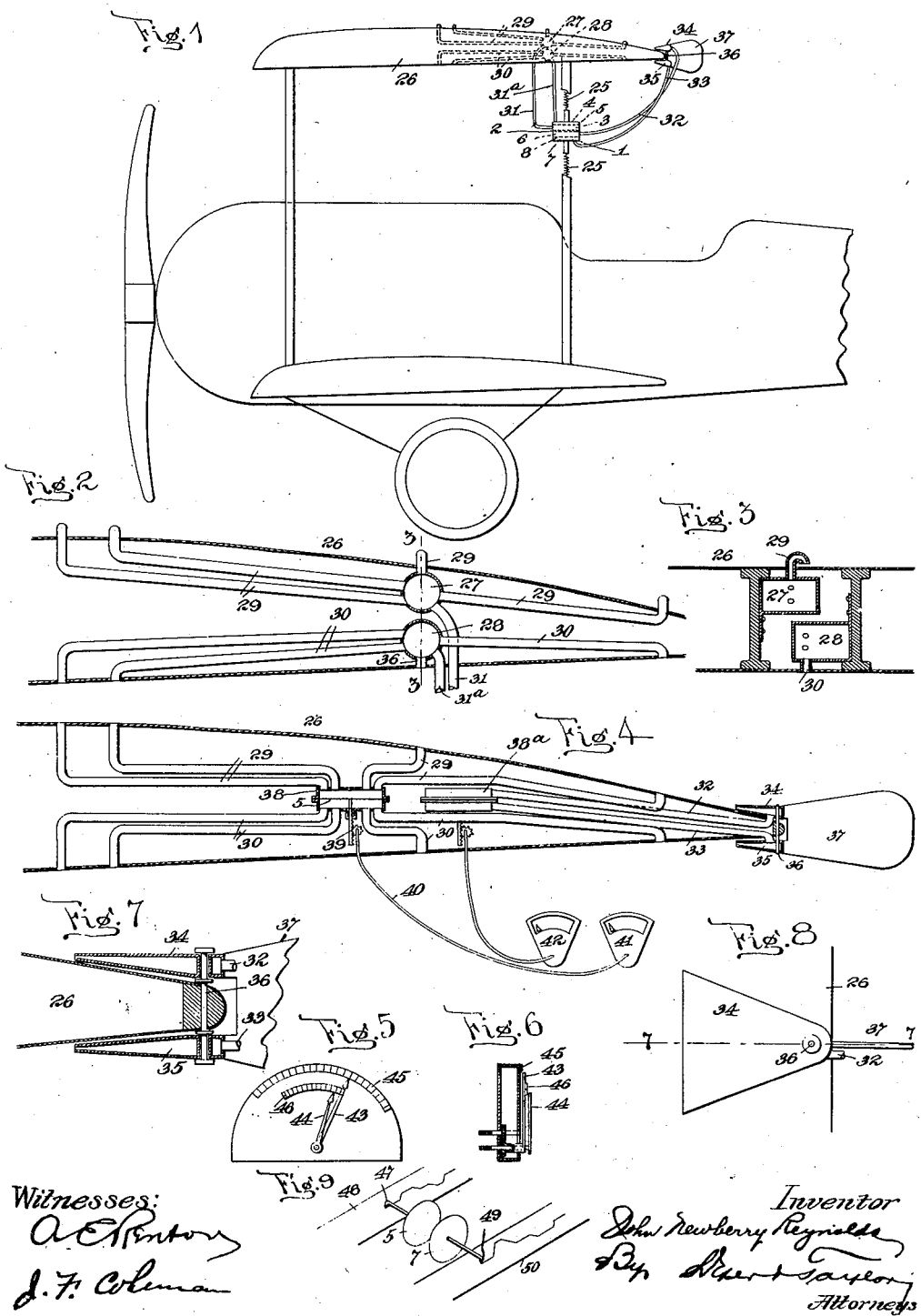

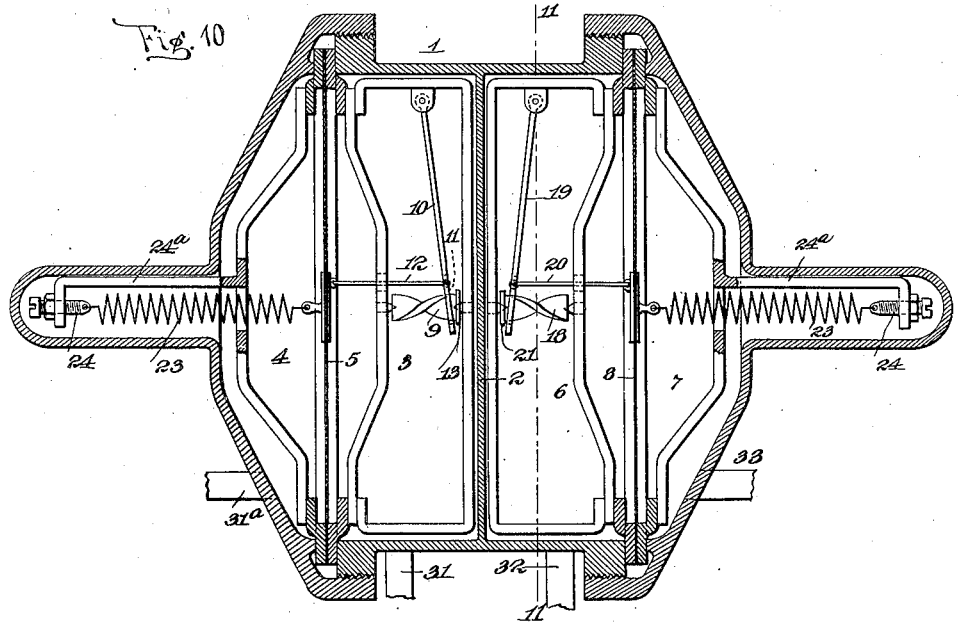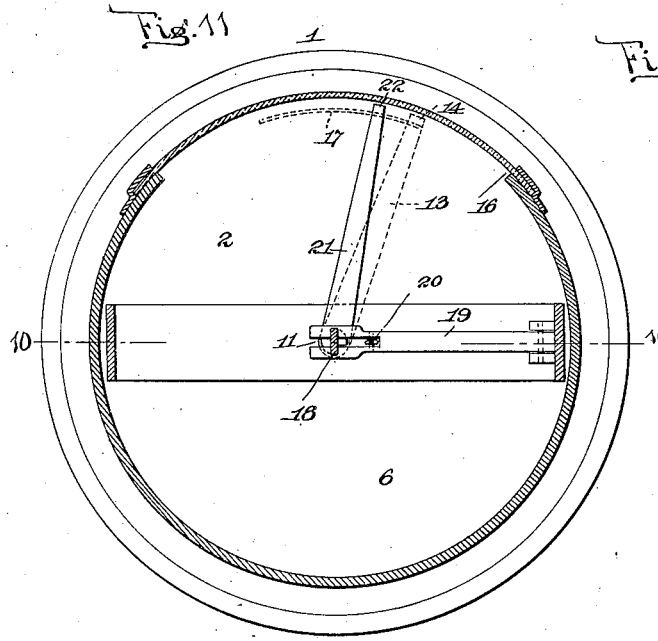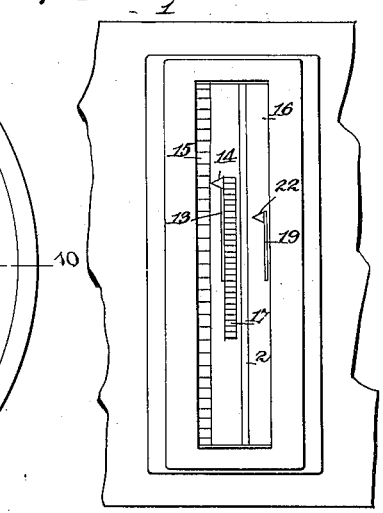

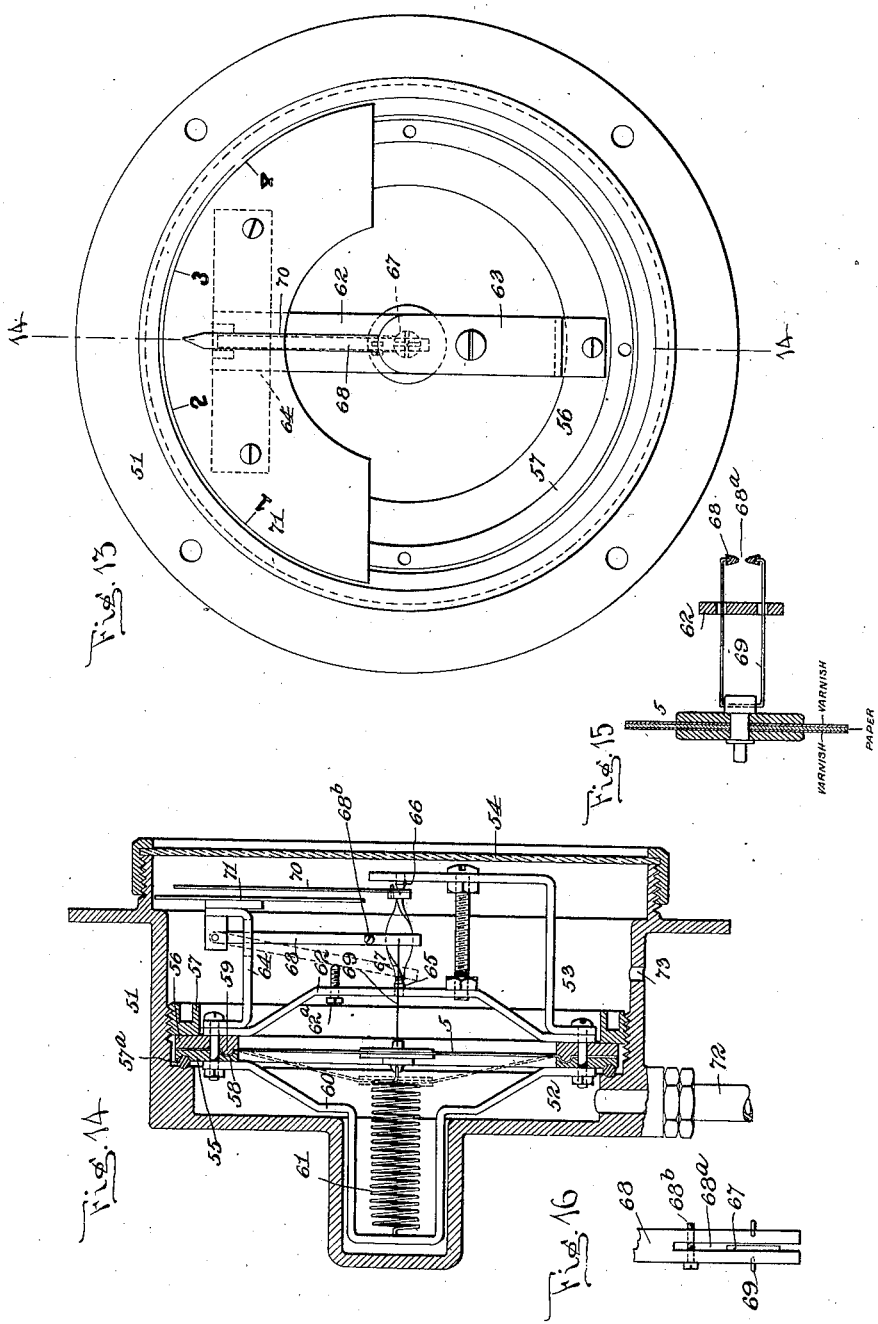

Patented Aug. 12, 1924.

1,504,785

UNITED STATES PATENT OFFICE.

JOHN NEWBERRY REYNOLDS, OF GREENWICH, CONNECTICUT.

METHOD OF AND APPARATUS FOR INDICATING THE ATTITUDE OF AIRCRAFT.

Application filed December 30, 1918, Serial No. 268,871. Renewed January 21, 1924.

*To all whom it may concern:*

Be it known that I, JOHN NEWBERRY REYNOLDS, a citizen of the United States, residing in the town of Greenwich, county of Fairfield, and State of Connecticut, have invented a certain new and useful Method of and Apparatus for Indicating the Attitude of Aircraft, of which the following is a specification.

My invention relates to measuring instruments and more particularly to devices for use in connection with flying machines of the heavier-than-air type in which the weight of the apparatus and its cargo is sustained in the air by the reactions resulting when the aerofoils are moved through the air. The movement of the aerofoils through the air causes reactions thereon resulting in positive pressure on the bottom camber and negative pressure or suction on the top camber.

Positive pressure is caused by the piling up, as it were, of the air beneath the lower surface of the aerofoil, and negative pressure being a rarefaction of the air or a partial vacuum over the upper surface.

It is the resultant upward components of these reactions which give buoyancy to the aeroplane, cause it to be supported above the surface of the earth and determines its attitude to the air stream through which it moves. The magnitude of this sustaining force depends on two general conditions, i. e., the angle of incidence, which is the angular position of the aerofoil relatively to the air stream, and the speed at which the machine is moved. These forces vary in intensity depending upon their points of application relatively to the leading and tailing edges of the aerofoils.

It is desirable at all times during flight that the aviator shall be advised as to the sustaining force acting on the aerofoils and that such sustaining force does not drop below a certain minimum value known as the stalling point, that is the value at which the apparatus will not be sustained in the air.

It is also highly desirable that the aviator shall know the angle of incidence at which his machine is flying in order that he may operate the machine most intelligently and efficiently.

One object of my invention is to provide means for indicating the angle of incidence as well as for indicating the buoyancy of the machine at all times during flight.

A further object is to provide means whereby the positive and negative pressures may be taken from different points on the bottom and top cambers in order to obtain more nearly average pressures over a given area, and whereby such average pressures may be conducted to a common receiver.

A further object is to provide means whereby the indicator may be situated at a distance from the aerofoil and within convenient reach of the aviator.

A further object is to provide means for indicating the buoyancy and the angle of incidence on a single instrument.

Further objects are to prevent the entrance of water to the pressure responsive means, to eliminate vibrations of the device, and to so construct and arrange the instrumentalities for indicating the angle of incidence that the air inlets will be always presented to the wind.

These and further objects will more fully appear in the following specification and accompanying drawings considered together or separately.

I have illustrated one embodiment of my invention in the accompanying drawings, in which like parts in all of the several figures are designated by similar reference characters, and in which—

Fig. 1 is a side elevation of a portion of a biplane embodying my invention.

Fig. 2 is an enlarged sectional view of a portion of an aerofoil.

Fig. 3 is a section on the line 3—3 of Fig. 2.

Fig. 4 is a sectional view of an aerofoil showing the pressure responsive elements located in the aerofoil and a plurality of indicators.

Fig. 5 is a front elevation of a modified form of indicator.

Fig. 6 is a sectional view of the same.

Fig. 7 is a detail sectional view of the pressure receiving elements of the angle indicator, the section being taken on the line 7—7 of Fig. 8.

Fig. 8 is a plan view of the same.

Fig. 9 is a diagrammatic view of a device for making a permanent record of changes in buoyancy and angle of incidence.

Fig. 10 is an enlarged sectional view of the preferred form of indicator, the section being taken on the line 10—10 of Fig. 11.

Fig. 11 is a sectional view of the same taken on the line 11—11 of Fig. 10.

Fig. 12 is an elevation of a portion of the same.

Fig. 13 is a front elevation of a modified form of indicator for use in indicating the pressure of an enclosed medium.

Fig. 14 is a section on the line 14—14 of Fig. 13.

Fig. 15 is a sectional view, on an enlarged scale, of the preferred form of diaphragm and its connection with the lever, and Fig. 16 is a detail elevation of the operating lever.

In the preferred embodiment of my invention I provide a casing 1 having a central partition 2 by means of which the casing is divided into two compartments. One compartment is divided into two chambers 3 and 4 by a flexible diaphragm 5. The other compartment is likewise divided into two chambers 6 and 7 by a similar diaphragm 8. The chambers 3 and 6 are in communication with the atmosphere at the top camber of an aerofoil and the chambers 4 and 7 are in communication with the atmosphere at the bottom camber of the same aerofoil.

Within each chamber 3 and 6 is axially pivoted a flat plate 9 so fashioned that its longitudinal edges will form a helix, and a transverse section, of which at any point will form a rectangular figure. A lever 10 pivoted in the chamber 3 is provided at its free end with an elongated slot 11 within which the helix engages. The slot is so proportioned and arranged relatively to the helix 9 that any movement of the lever on its pivot will rotate the helix. A pitman 12 is pivotally connected to the lever 10 and to the diaphragm 5 whereby movements of the latter will be communicated to the lever and thence to the helix.

Carried by the helix 9 is an arm 13 the free extremity of which forms a pointer 14 which cooperates with a graduated scale 15 visible through a window 16 in the side of the casing 1. Carried by and movable with the arm 13 is a graduated scale 17 for a purpose to be described.

Within the chamber 6 are carried a helix 18 a lever 19, a pitman 20 and an arm 21 carrying a pointer 22 all operating in the same manner as the corresponding parts in the chamber 3. The pointer 22 cooperates with the scale 17 carried by the arm 13.

A spring 23 is attached to each diaphragm at the side opposite the connection to the lever 10 or 19 as the case may be. The opposite end of each spring is secured to a tensioning screw 24 carried by an arm 24ª on a supplemental frame in the chamber at that side of the diaphragm.

In the drawings I show several different arrangements by means of which the indicating means are located in such positions as to be readily observed by the aviator.

In Figs. 1, 2 and 3 the pressure responsive and indicating devices are in a single casing as described above. The casing is carried on the fuselage in proximity to the aviator's seat and is in communication with the atmosphere at the top and bottom cambers of an aerofoil. The device is illustrated in connection with one aerofoil of a biplane but I desire to have it understood that the invention may be utilized in connection with machines having any number of sustaining planes and the instrument may be in communication with the air on the cambers of any one or more of such planes or it may respond to positive pressures on one plane and negative pressures on another plane.

In Fig. 1 the casing is shown as carried on the framework by means of which the aerofoils are supported and over the front end of the cockpit in which the aviator is seated. The casing is preferably suspended and positioned by means of springs 25 in order that it will not be influenced by vibrations of the machine.

In the aerofoil 26 and between the top and bottom cambers of the same are carried two cylindrical casings 27 and 28. The casing 27 is provided with a plurality of tubes 29 each of which communicates with the atmosphere at or near the upper surface of the wing but at different points longitudinally of the machine. The casing 28 has a similar number of tubes 30 in communication with the atmosphere at or near the lower surwace of the aerofoil and at points directly opposite the outlets of the tubes 29. The casing 27 is in communication with the chamber 3 by means of a conduit 31 and the casing 28 is similarly connected to the chamber 4 by a conduit 31ª. By this arrangement the pressures in the chambers will be the same as that in their respective casings and the pressures in the latter will be approximately the average of the pressures at the ends of the tubes 29 and 30 respectively. A portion at least of each conduit is flexible to allow for relative movements of the casing 1.

In order to prevent the admission of water to the mixing chambers 27 and 28 and to the chamber 4 a water seal may be placed in each of the tubes 29. The tubes are illustrated in Figs. 1, 2 and 3 as projecting above the upper surface and bent over to bring the open ends of the tubes into close proximity to the surface of the aerofoil. Instead of the water seal shown, any suitable water trap may be utilized.

The chambers 6 and 7 of the casing 1 communicate respectively with the atmosphere at top and bottom surfaces of the aerofoil at or near the trailing edge thereof by means of flexible tubes 32 and 33. The tubes communicate with wind scoops 34 and 35 respectively. The wind scoops are so proportioned that the entrances thereof lie close to the top and bottom surfaces of the aerofoil and preferably extend over a considerable portion of the surface. This is accomplished by flaring the front portions of the scoops laterally. The inlet openings though being long are narrow in order that the area of each opening will be approximately the same as that of the bore of the tube.

The scoops are carried on a vertical pivot 36 carried by the plane and have attached thereto a vane 37 by means of which the scoops are always in position with their orifices presented directly to the wind. In the drawings the scoops are illustrated as pivoted in that frame member of the aerofoil 2 which when in position, is at the rear or trailing edge of the aerofoil. The scoops project forward from the pivots 3 and the scoop entrance is located a short distance forward of the trailing edge. Obviously the pivot 36 may be supported to the rear of the aerofoil and the scoop entrance be located as near to the trailing edge as may be desired.

In Fig. 4 I show a modification of the invention in which the pressure responsive and indicating elements are separated, the former being located in the aerofoil and the latter at a distant point. The diaphragm 5 is carried in a casing 38 which may be directly connected to the tubes 29 and 30. Mechanical connections such as a rack and pinion 39 and a flexible shaft 40 gear the diaphragm to an indicator 41. The pressures near the trailing edge will be taken in a casing 38ª and noted on an indicator 42.

If desired a single indicating instrument such as illustrated in Figs. 5 and 6 may be employed. Two pointers 43 and 44 are employed. These are mounted as are the hands of a clock. The hand 43 cooperates with a scale 45 in the casing and the hand 44 cooperates with a scale 46 carried by the hand 43. The hand 43 will indicate on the scale 45 the buoyancy of the machine and the relative positions of the hands as indicated on the scale 46 will give the angle of incidence at which the machine is flying. The hands 43 and 44 may be driven by the flexible shafts shown in Fig. 4.

In the drawings I have illustrated my invention in position to indicate the pressures on the upper aerofoil of a biplane and have shown the openings through which the pressures are transmitted to the pressure responsive mechanism as arranged in line with the longitudinal center of the machine, and out of the influence of currents set up by the propeller, but I desire to have it understood that my invention is not limited to such arrangements. The device may be applied to any one or more of the aerofoils of a multiplane machine. Separate devices may be used for separate aerofoils to indicate the pressures on each wing, or pressure responsive elements may be located at several points on the machine and all communicate with a single indicator so that the average pressures be obtained. I prefer to arrange the inlets of the tubes 29 and 30 one behind the other as shown and also slightly out of line as viewed from above whereby the forward openings will not interfere with those to the rear. The inlets of the tubes 32 and 33 as near the trailing edge of the supporting surface as possible, as according to my present knowledge, they function most effectively when so located.

By means of the manifolds 27 and 28 or of connecting the inlet tubes in multiple with their respective chambers in the pressure responsive element as shown in Fig. 4 approximately average pressures are secured. Working with such low pressures and with such slight variation between pressure and suction this feature is of prime importance.

While I have shown the inlet tubes on opposite sides of the aerofoil as similar in number for each indicator and as communicating with the atmosphere directly opposite each other, I desire to have it understood that I do not wish to limit myself to such an arrangement. The inlets of the tubes may be located as desired and the number in one camber may differ from that in the other.

In Fig. 9 I show an arrangement by means of which a permanent record of changes in buoyancy and angle may be made. The diaphragm 5 may carry a marker 47 cooperating with a moving tape 48 for recording the buoyancy. The diaphragm 7 is provided with a marker 49 engaging a tape 50 for recording changes in the angle of incidence.

The operation is as follows:

When the machine is at rest the air pressure is the same on both cambers of the aerofoil and the diaphragms 5 and 8 will assume the neutral positions. As the machine is set in motion, as by the propeller, the air pressure on the sides of the diaphragms open to the bottom camber will increase and the pressure on the opposite side will decrease. This will cause a movement of the diaphragms toward the regions of lower pressure, and by properly calibrating the springs 23, the device will be caused to weigh at all times the force tending to maintain the airplane in the air, in other words, to indicate the buoyancy of the machine.

If, at a given speed, the indicator shows that the lift is not sufficient to support the machine at the angle at which its supporting surfaces are set relatively to the air stream, the operator will swing the tail flap or elevator upward. This will cause the leading edges of the aerofoils to be tilted upward and change the angle of incidence and the change in pressures on the cambers will flex the diaphragms and cause the pointer 14 to indicate the buoyancy of the machine on the scale 15 and at the same time the pointer 22 will indicate the new angle of incidence on the scale 17.

Both diaphragms 5 and 8 with their associated pointers 14 and 22, will be displaced an equal amount by a change in buoyancy due to a change in air speed. They will be displaced an unequal amount by a change due to an alteration of the angle of incidence, i. e. with the angle held constant and the air speed changed the two diaphragms and associated pointers will respond alike to the altered pressures resulting. If however, the angle is also changed the two diaphragms will not respond in unison, one being moved to a greater or less degree than the other.

It will be found that this relative movement between the two diaphragms will be a different amount for each angle of incidence and that it will be the same at any particular angle within the range of flying speeds.

Assuming that with the plane in flight and at a constant angle of incidence, the buoyancy will be read by the position of pointer 14 on the scale 15. The angle will be read by the position of the pointer 22 relative to the scale 17. If now the air speed be increased both pointers 14 and 22 will advance an equal amount with respect to the scale 15 but if the angle be permitted to change, the amount of the change and the new angle resulting will be shown by a different position of the pointer 22 relative to scale 17.

If the speed of the machine changes due to variations of engine speed or changes in wind pressure, the pointers will move relatively to the scale 15 and the operator can tell at a glance that either the air speed or the angle has changed and can so manipulate the machine to make the desired corrections.

It is obvious that while a reading of the sum of the positive and negative pressures is desirable, a reading of either may be sufficient. If it be desirable to make note of the positive pressure only the tubes communicating with the atmosphere at the top camber may be omitted. If, on the other hand, the suction is to be relied upon no communication with the bottom camber will be necessary. The buoyancy may be indicated by either the suction or pressure and the angle by both or the latter may be found by either and the bouyancy by both as is found desirable or necessary.

It will of course be understood that the device will operate in the same manner when the machine is gliding as when the engine is running and the propeller is in operation.

The diaphragm 5 is preferably composed of a sheet of thin, tough, flexible material, both sides of which are coated with a film of a material impervious to gas and moisture. A thin, tough paper, such as is used in Japan instead of glass in windows, and for covering unbrellas, coated on both sides with artists' varnish applied by spraying, is admirably adapted for this purpose. This varnish, while it dries to such an extent as to lose its tacky nature, does not become rigid, will not crack under the usual extremes of temperature, but remains pliable under all ordinary conditions.

In Figs. 13 and 14 I have illustrated an embodiment of my invention, particularly adapted for measuring the pressure of inclosed gases, such, for example, as in aerial devices of the lighter-than-air type, such as dirigibles, balloons, ballonets, and balloon kites, whereby the proper pressure may be applied when filling the envelop, and also that the aviator may be advised as to the pressure in the device at all times during flight.

The embodiment of the invention illustrated comprises a casing 51 divided into two chambers 52 and 53 by means of a varnished paper diaphragm 5. One side 54 of the casing may be of glass, in order that the interior may be viewed. The diaphragm is supported between two rings 55 and 56, which are retained in position by means of an annular nut 57, which engages the interior of the casing, and the rings carrying the diaphragm are held against an annular shoulder in the casing by means of the nut 57. A gasket 57ª is interposed between the ring and shoulder, thereby producing a gas-tight joint between the chambers. The said gasket is in the form of a cylindrical ring resting in grooves in the ring 55 and shoulder. The ring 55 is provided with a circular recess 58 on one face thereof, and the ring 56 has circular beads 59 on one face. When the rings are in position the bead 59 will enter the recess 58 and securely retain the diaphragm in position.

The ring 55 carries a yoke 60 and a spring 61 is attached to the yoke and to the diaphragm. The tension of the spring may be adjusted, as shown in Fig. 10, or otherwise, or the tensioning feature may be omitted if desired.

The ring 56 carries a yoke 62, and extension 63, and a bracket 64. The yoke 62 carries a conical pivot point 65, and the extension 63 is provided with a conical pivot point 66 in axial alinement with the point 65.

A helix 67 is rotatably mounted between the points 65 and 66, and the helix passes through a slot 68ª in the free end of a lever 68 pivoted to the bracket 64, and the said lever is connected to the diaphragm by means of a pitman 69 which is connected to the center of the diaphragm. A set screw 62ª carried by the yoke 61 is adapted to be engaged by the lever 68 and limit the movement of the diaphragm toward the spring 61. A screw 68ª passes through the slotted end of the lever 68 whereby the slot 68ª may be adjusted. The helix 67 carries at one end a hand or pointer 70, which co-operates with a scale 71 carried by the bracket 64, and the pointer and scale are visible through the front 54 of the casing.

The chamber 52 is in communication with the interior of the element containing the gaseous fluid by means of a flexible tube 72, and the chamber 53 is in communication with the atmosphere by means of a breathing opening 73.

The yoke, or bridge member, 62, is so positioned relatively to the diaphragm that the latter, or some attachment carried thereby, will contact with the yoke and limit the movement of the diaphragm in that direction. Under normal conditions the diaphragm, owing to the slight pressures to be measured, will not be moved to an extent sufficient to contact with the yoke. The yoke 62 may be adjusted toward or away from the diaphragm, or the yoke may carry an adjustable device with which the diaphragm may contact.

The spring 61 will prevent excessive movement of the diaphragm in the opposite direction, but other limiting means may, if desired, be employed.

The diaphragm 5 is inert and is not under initial tension. It will not assume the central position except when moved by pressure in the chamber 52. Its normal position is that shown in dotted lines in Fig. 14.

In accordance with the provisions of the patent statutes, I have described the principle of my invention, together with the apparatus which I now consider to represent the best embodiment thereof; but I desire to have understood that the apparatus shown is merely illustrative and that the invention may be carried out in other ways.

Having now described my invention what I claim and desire to secure by Letters Patent is:

1. An indicator for flying machines, comprising an aerofoil, means responsive to air reactions due to that relative movement of the air and aerofoil which produces the necessary lifting forces, there being a conduit communicating with the responsive means and the air, said conduit having an opening in proximity to and facing the top surface of the aerofoil.

2. An indicator for flying machines, comprising an aerofoil, a diaphragm responsive to air reactions above and below the aerofoil due to the relative movement of the air and aerofoil which produces the necessary lifting forces, there being a tube communicating with one side of the diaphragm and with the atmosphere above the aerofoil, said tube extending above the aerofoil, there being a return bend in the tube, the open end of the tube being in proximity to the top camber of the aerofoil, there being a tube communicating with the other side of the diaphragm and with the atmosphere below the aerofoil, and an indicator operated by the diaphragm.

3. An indicator for flying machines, comprising an aerofoil, a diaphragm carried by the aerofoil, there being a passage communicating with one side of the diaphragm and with a plurality of points at the upper surface of the aerofoil, there being a passage communicating with the opposite side of the diaphragm and with a plurality of points at the lower surface of the aerofoil, whereby the diaphragm will be responsive to air ractions above and below the aerofoil due to that relative movement of the air and aerofoil which produces the necessary lifting forces, a scale located at a point removed from the diaphragm, a pointer co-operating with said scale, and means whereby the pointer may be moved by movements of the diaphragm.

4. An indicator for flying machines, comprising an aerofoil, there being a series of openings in a surface of the aerofoil, said opening being located at different distances from the leading edge of the aerofoil, there being a chamber in communication with said openings, and means responsive to variations in pressure at said openings.

5. An indicator for flying machines, comprising an aerofoil, there being a series of openings in a surface of the aerofoil, said openings being located at different distances from the leading edge of the aerofoil, there being a chamber in communication with said openings means responsive to variations in pressure at said openings, and means for indicating movements of the responsive means.

6. An indicator for flying machines, comprising an aerofoil, there being a series of openings in a surface of the aerofoil, said openings being located at different distances from the leading edge of the aerofoil, there being a chamber in communication with said openings, and means responsive to variations in pressure at said openings, said pressure responsive means being located at a distance from the aerofoil.

7. An indicator for flying machines, comprising an aerofoil, there being a series of openings in a surface of the aerofoil, said openings being located at different distances from the leading edge of the aerofoil, there being a chamber in communication with said openings means responsive to variations in pressure at said openings, said indicating means being located at a distance from the aerofoil.

8. An indicator for flying machines, comprising an aerofoil, there being a series of openings in a surface of the aerofoil, said openings being located at different distances from the leading edge of the aerofoil, there being a chamber in communication with said openings means responsive to variations in pressure at said openings, said pressure responsive and indicating means being located at a distance from the aerofoil.

9. An indicator for flying machines, comprising an aerofoil, there being a series of openings communicating with the atmosphere at the upper surface of the aerofoil, said openings being located at different distances from the leading edge of the aerofoil, said openings communicating with a common chamber, a similarly disposed series of openings communicating with the atmosphere at the bottom surface of the aerofoil, said openings leading to a common chamber, and means common to all of said openings and responsive to air reactions due to that relative movement of the air and aerofoil which produces the necessary lifting forces at any or all of said openings.

10. An indicator for flying machines, comprising an aerofoil, there being a series of openings communicating with the atmosphere at the upper surface of the aerofoil, said openings being located at different distances from the leading edge of the aerofoil, said openings communicating with a common chamber, a similarly disposed series of openings communicating with the atmosphere at the bottom surface of the aerofoil, said openings leading to a common chamber, means common to all of said openings and responsive to air reactions due to that relative movement of the air and aerofoil which produces the necessary lifting forces at any or all of said openings, and means for indicating the value of the lifting forces.

11. An indicator for flying machines, comprising an aerofoil, there being a series of openings communicating with the atmosphere at the upper surface of the aerofoil, said openings being located at different distances from the leading edge of the aerofoil, said openings communicating with a common chamber, a similiarly disposed series of openings communicating with the atmosphere at the bottom surface of the aerofoil, said openings leading to a common chamber, and means common to all of said openings and responsive to air reactions due to that relative movement of the air and aerofoil which produces the necessary lifting forces at any or all of said openings, said responsive means being located at a point distant from the aerofoil.

12. An indicator for flying machines, comprising an aerofoil, there being a series of openings communicating with the atmosphere at the upper surface of the aerofoil, said openings being located at different distances from the leading edge of the aerofoil, said openings communicating with a common chamber, a similarly disposed series of openings communicating with the atmosphere at the bottom surface of the aerofoil, said openings leading to a common chamber, means common to all of said openings and responsive to air reactions due to that relative movement of the air and aerofoil which produces the necessary lifting forces at any or all of said openings, and means for indicating the value of the lifting forces, said responsive and indicating means being located at a distance from the aerofoil.

13. An aeroplane comprising an aerofoil, and means responsive to air reactions on the aerofoil due to changes in the angle of incidence of the aerofoil.

14. An aeroplane comprising an aerofoil, means responsive to air reactions on said aerofoil due to that relative movement of the air and aerofoil which produces the necessary lifting force for indicating the buoyancy of the aeroplane, and means responsive to air reactions on the aerofoil for indicating the angle of incidence of the aerofoil.

15. An aeroplane comprising an aerofoil, and means responsive to air reactions above and below the aerofoil due to changes in the angle of incidence of the aerofoil.

16. An aeroplane comprising an aerofoil, means responsive to air reactions above and below said aerofoil due to that relative movement of the air and aerofoil which produces the necessary lifting force for indicating the buoyancy of the aeroplane, and means responsive to air reactions above and below the aerofoil for indicating the angle of incidence of the aerofoil.

17. An aeroplane comprising an aerofoil, means carried by the aerofoil and communicating with the atmosphere in proximity to the top and bottom cambers thereof, and means responsive to air reactions on the aerofoil at a distance from said first mentioned means for indicating the angle of incidence of the aerofoil.

18. An aeroplane comprising an aerofoil, scoops carried by the aerofoil and communicating with the atmosphere in proximity to the top and bottom cambers thereof. and means responsive to air reactions on the aerofoil in proximity to said scoops for indicating the angle of incidence of the aerofoil.

19. An aeroplane comprising an aerofoil, pivoted scoops carried by the aerofoil and communicating with the atmosphere in proximity to the top and bottom cambers thereof and means responsive to air reactions on the aerofoil in proximity to said scoops for indicating the angle of incidence of the aerofoil.

20. An aeroplane comprising an aerofoil, pivoted scoops carried by the aerofoil and communicating with the atmosphere in proximity to the top and bottom cambers thereof, means responsive to air reactions on the aerofoil in proximity to said scoops for indicating the angle of incidence of the aerofoil, and means for presenting the mouths of the scoops to the wind.

21. An aeroplane comprising an aerofoil, pivoted scoops carried by the aerofoil and communicating with the atmosphere in proximity to the top and bottom cambers thereof, means responsive to air reactions on the aerofoil in proximity to said scoops for indicating the angle of incidence of the aerofoil, and a vane for presenting the mouths of the scoops to the wind.

22. An aeroplane comprising an aerofoil, and means in communication with the atmosphere in proximity to the trailing edge of the aerofoil, said means being responsive to air reactions on the aerofoil due to changes in the angle of incidence of the aerofoil.

23. An aeroplane comprising an aerofoil, and means in communication with the atmosphere in proximity to the trailing edge of the aerofoil, said means being responsive to air reactions above and below the aerofoil due to changes in the angle of incidence of the aerofoil.

24. An aeroplane comprising an aerofoil, means responsive to air reactions on the aerofoil for indicating the buoyancy of aeroplane, and means in communication with the atmosphere in proximity to the trailing edge of the aerofoil, said means being responsive to air reactions on the aerofoil due to changes in the angle of incidence of the aerofoil.

25. An aeroplane comprising an aerofoil, means responsive to air reactions on the aerofoil for indicating the buoyancy of aeroplane, and means in communication with the atmosphere in proximity to the trailing edge of the aerofoil, said means being responsive to air reactions above and below the aerofoil due to changes in the angle of incidence of the aerofoil.

26. An aeroplane comprising an aerofoil, a scoop having an inlet opening therein and in communication with the atmosphere in proximity to the surface of the aerofoil, said inlet opening being in proximity to the trailing edge of the aerofoil, and means responsive to air reactions on the aerofoil for indicating the angle of incidence of the aerofoil.

27. An aeroplane comprising an aerofoil, scoops each having an inlet opening therein and in communication with the atmosphere in proximity to the top and bottom cambers of the aerofoil, said inlet openings being in proximity to the trailing edge of the aerofoil, and means in communication with said scoops and responsive to air reactions on the aerofoil for indicating the angle of incidence.

28. An aeroplane comprising an aerofoil, pivoted scoops each having an inlet opening therein and in communication with the atmosphere in proximity to the top and bottom cambers of the aerofoil, said inlet openings being in proximity to the trailing edge of the aerofoil, means in communication with said scoops and responsive to air reactions on the aerofoil for indicating the angle of incidence, and means for presenting the mouths of the scoops to the wind.

29. An aeroplane comprising an aerofoil and means responsive to air reactions on the aerofoil for indicating the buoyancy and angle of incidence of the aerofoil.

30. An aeroplane comprising an aerofoil and a single instrument responsive to air reactions on the aerofoil for indicating the buoyancy and angle of incidence of the aerofoil.

31. An indicator for flying machines, comprising an aerofoil, a casing, a flexible diaphragm within the casing and dividing the same into two chambers, one of said chambers being open to the atmosphere at the top of the aerofoil, the other of said chambers being open to the atmosphere at the bottom of said aerofoil, a lever pivoted within the casing, connections between said lever and the diaphragm whereby the lever will be moved in response to movements of said diaphragm, a rotatable helix within the casing, a pointer carried by the helix, connections between the lever and helix whereby movement of the lever longitudinally of the helix will rotate the latter and move the pointer, and a scale cooperating with the pointer.

32. An indicator for flying machines, comprising an aerofoil, a casing, means within the casing, and responsive to air reactions above and below the aerofoil due to that relative movement of the air and aerofoil which produces the necessary lifting forces, for indicating the buoyancy of the machine, and means within the casing, and responsive to air reactions above and below the aerofoil, for indicating the angle of incidence of the aerofoil.

33. An indicator for flying machines, comprising a casing, a partition within the casing and dividing the same into two compartments, a flexible diaphragm in one compartment dividing the same into two chambers one of which is in communication with the atmosphere above the aerofoil and the other of which is open to the atmosphere below the aerofoil whereby the diaphragm will be flexed by reason of differences in pressure on the surfaces of the aerofoil, a pointer movable by the diaphragm and co-operating with a scale for indicating the buoyancy of the machine, a scale carried by the pointer, means for adjusting the tension of the diaphragm, a second diaphragm dividing the other compartment into two chambers one of which is open to the atmosphere above the aerofoil and the other of which is open to the atmosphere below the aerofoil whereby said second diaphragm will be flexed by reason of differences in pressure above and below the aerofoil, a pointer movable by the second diaphragm and co-operating with the scale carried by the first mentioned pointer for indicating the angle of incidence of the aerofoil, and means for adjusting the tension of the second diaphragm.

34. The method of determining the attitude of an aeroplane, which comprises measuring the air pressure acting on the wing surfaces.

35. The method of determining the attitude of an aeroplane to the air stream through which it moves, which comprises measuring the pressure of the air at a plurality of points on the wing surface.

36. The method of determining the attitude of an aeroplane to the air stream through which it moves, which comprises measuring the pressure of the air at a plurality of points on the wing surface, one of said points being in proximity to the trailing edge of the wing.

37. The method of measuring the buoyancy and angle of incidence of an aeroplane, which comprises measuring the values of the air reactions on the wing surfaces.

38. The method of determining the angle of incidence of an aeroplane in flight which comprises ascertaining an average differential pressure between those at the top and bottom cambers of an aerofoil, ascertaining a differential pressure product by the air flow on the top and bottom cambers at the trailing edge of the aerofoil, and comparing said differential pressures.

39. The method of determining the angle of incidence of an aeroplane in flight which comprises comparing the differential pressure obtained through a series of openings at the top and bottom cambers of the aerofoil, said openings being positioned forward of the trailing edge of the aerofoil, with the differential pressure obtained on said top and bottom cambers in proximity to the trailing edge.

40. The method of determining the angle of incidence of an aeroplane in flight, which comprises comparing the average differential pressure obtained through a series of openings at the top and bottom cambers of the aerofoil, said openings being positioned forward of the trailing edge of the aerofoil, with the differential pressure obtained on said top and bottom cambers in proximity to the trailing edge.

41. The method of indicating the angle of incidence of an aeroplane in flight, which comprises ascertaining the pressures acting normal to the top and bottom of the wing surface at points removed from the trailing edge thereof, ascertaining the pressures normal to the air stream close to said surfaces in proximity to the trailing edge, and determining the co-relation between said pressures.

This specification signed and witnessed this eleventh day of December, 1918.

JOHN NEWBERRY REYNOLDS.

Witnesses:
J. F. COLEMAN,
A. E. RENTON.